Oct. 4, 1960 T. R. THOMAS 2,954,846
LUBRICANT MIST GENERATOR
Filed May 8, 1957 5 Sheets-Sheet 1
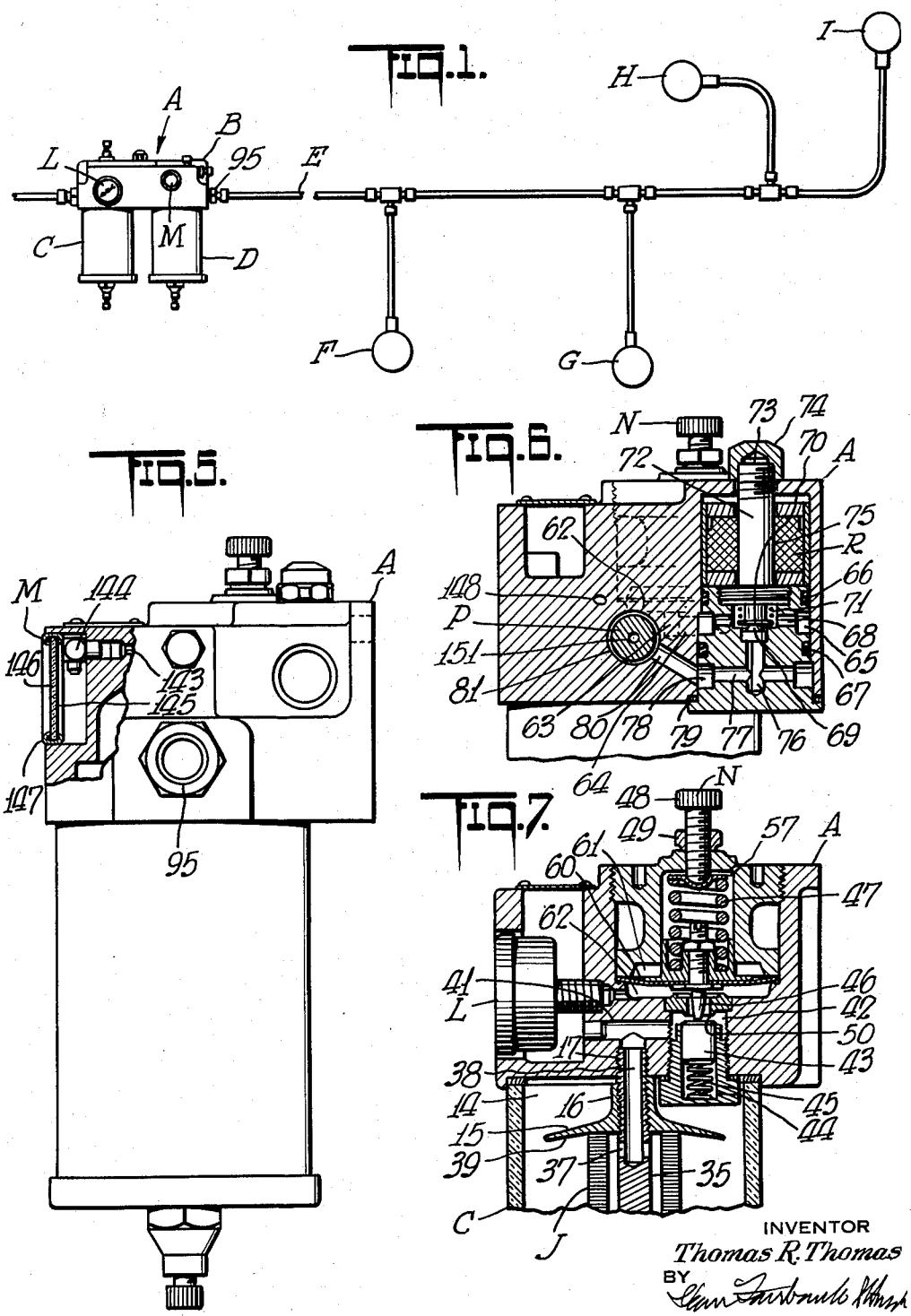
INVENTOR
Thomas R. Thomas
BY
ATTORNEY

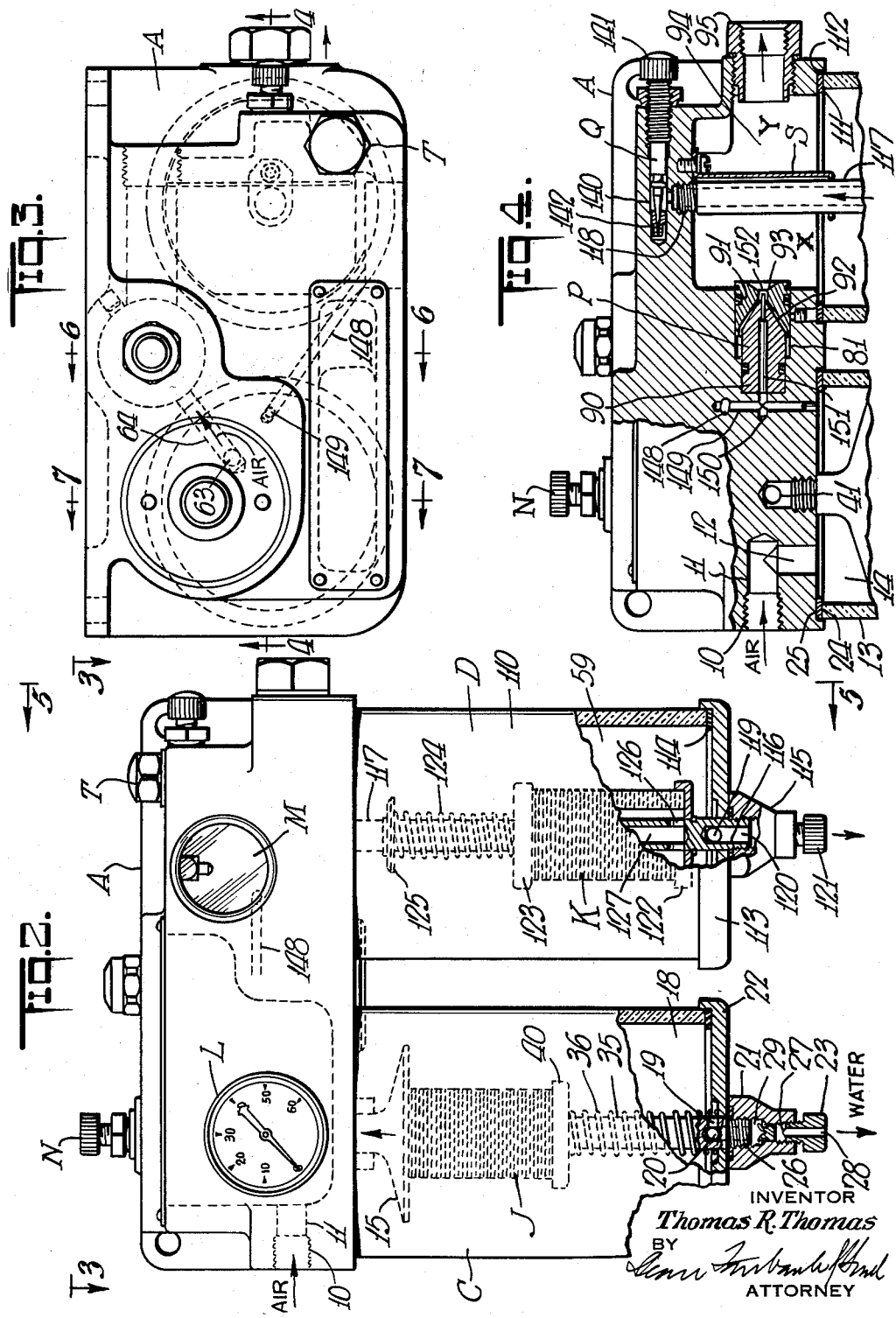

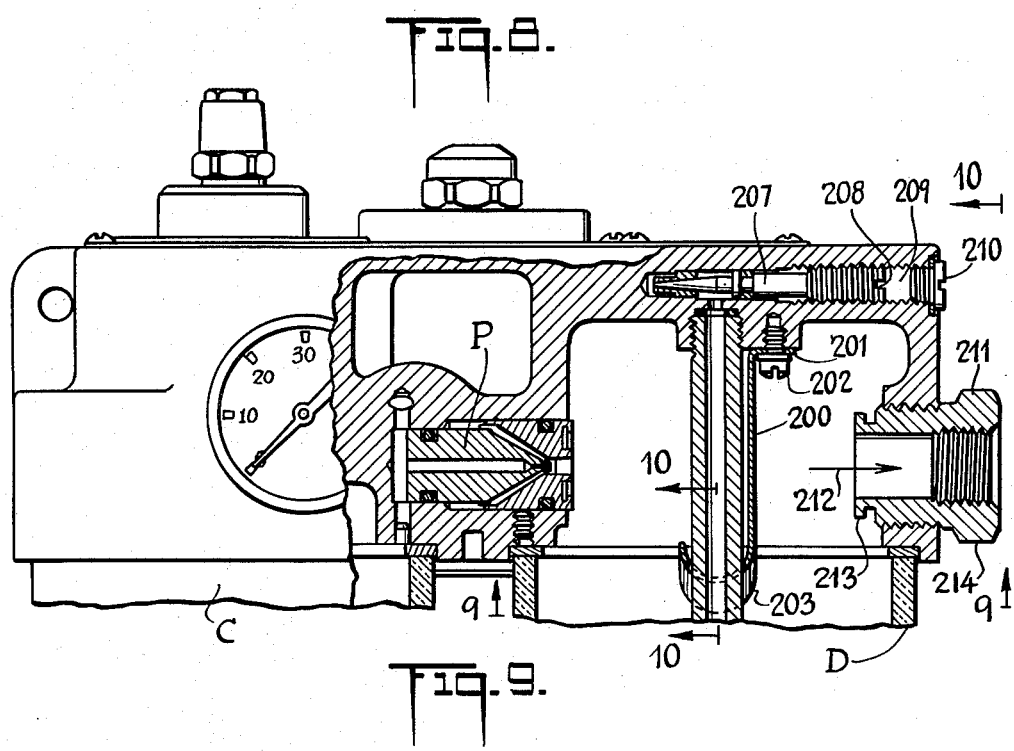
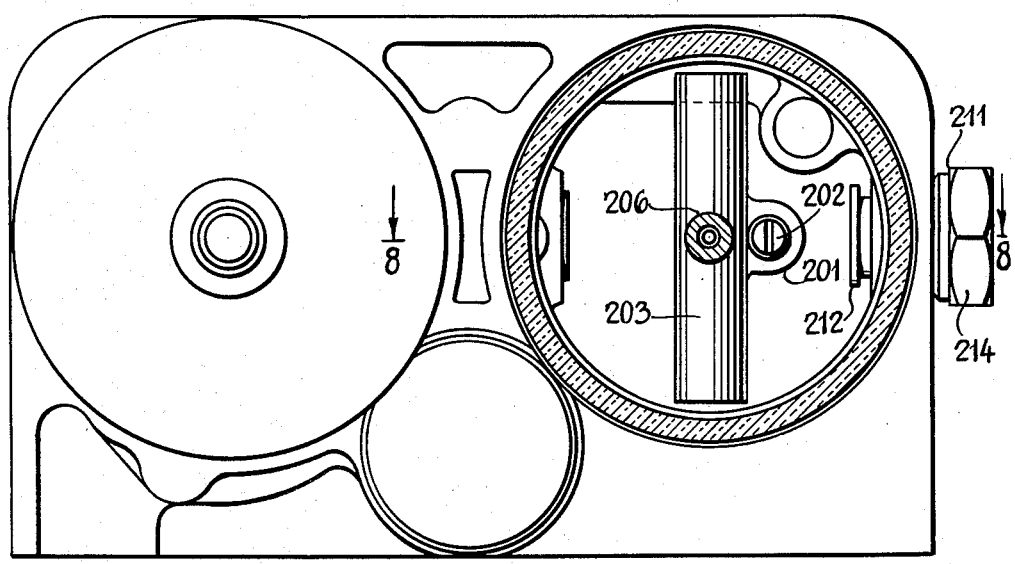

Oct. 4, 1960 T. R. THOMAS 2,954,846
LUBRICANT MIST GENERATOR
Filed May 8, 1957 5 Sheets-Sheet 4
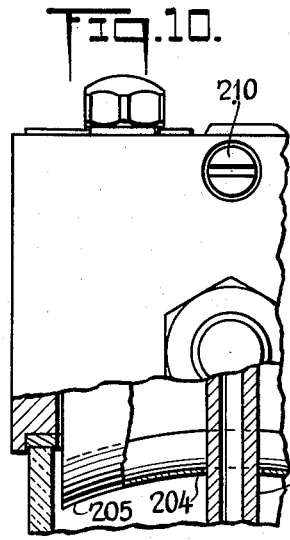
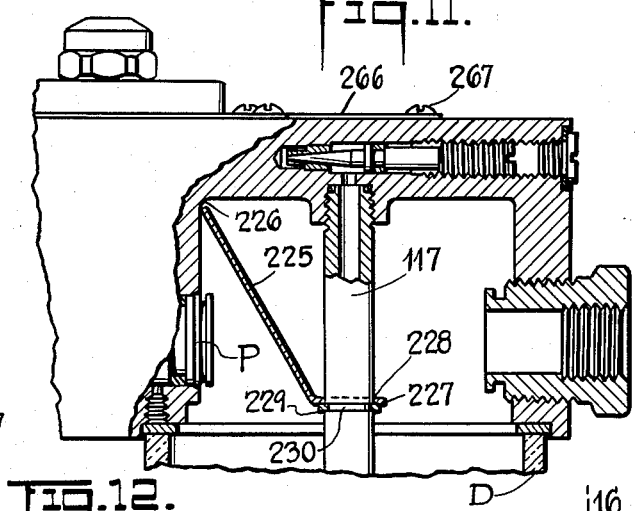
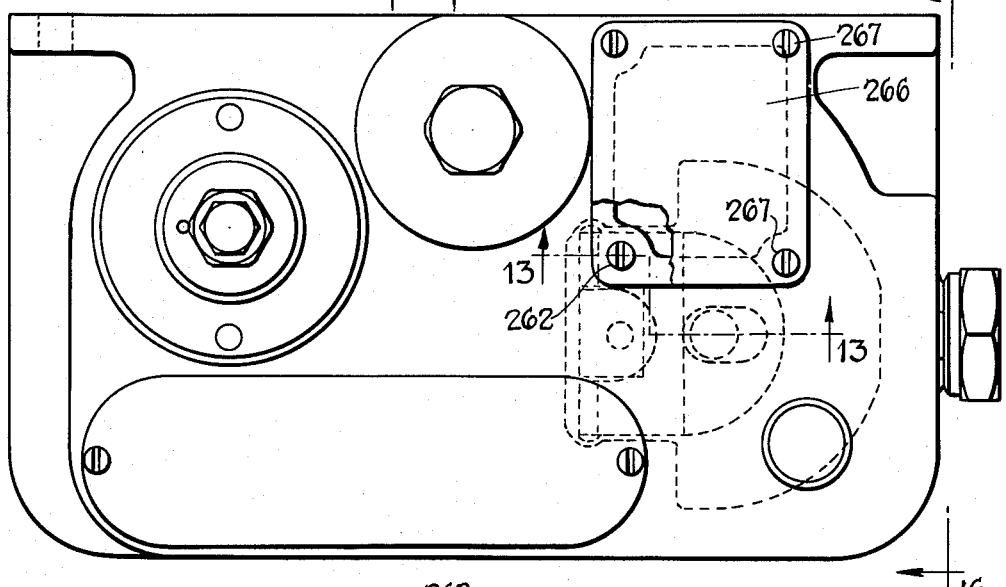
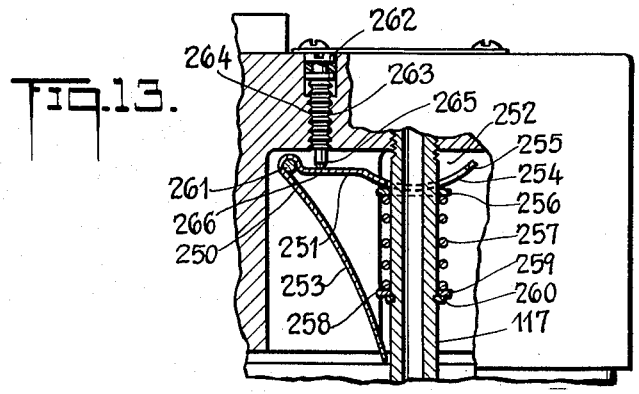
INVENTOR
*Thomas R. Thomas*
BY
*Dean Fairbank + Hirsch*
ATTORNEYS Oct. 4, 1960 T. R. THOMAS 2,954,846
LUBRICANT MIST GENERATOR
Filed May 8, 1957 5 Sheets-Sheet 5
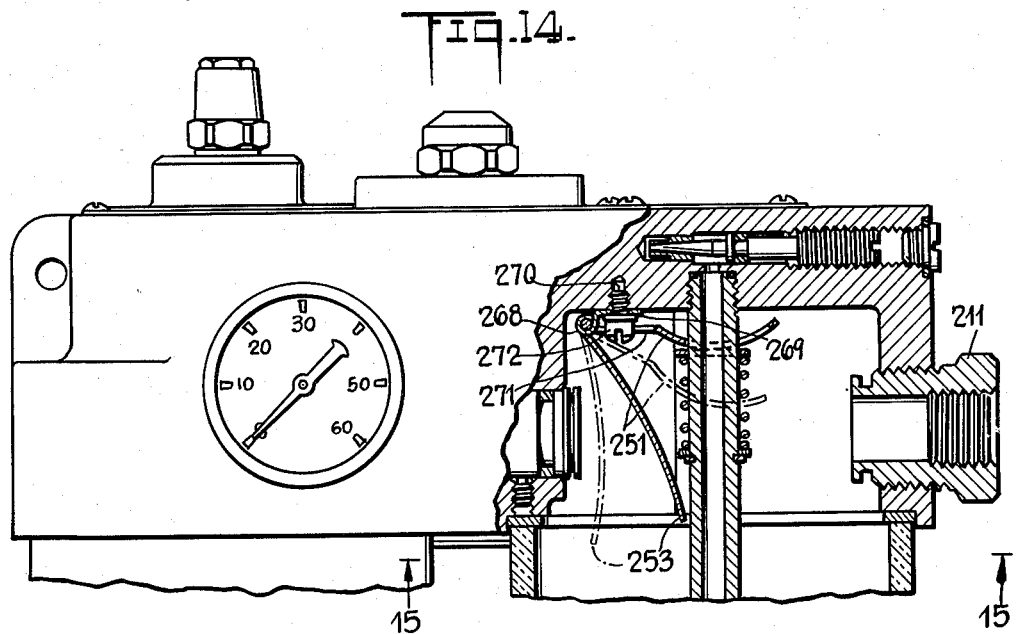
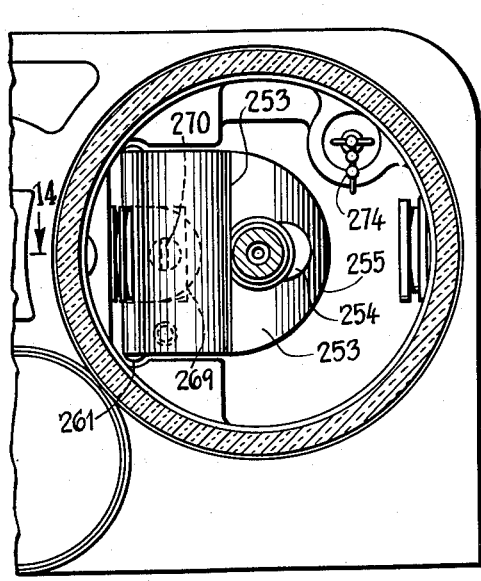
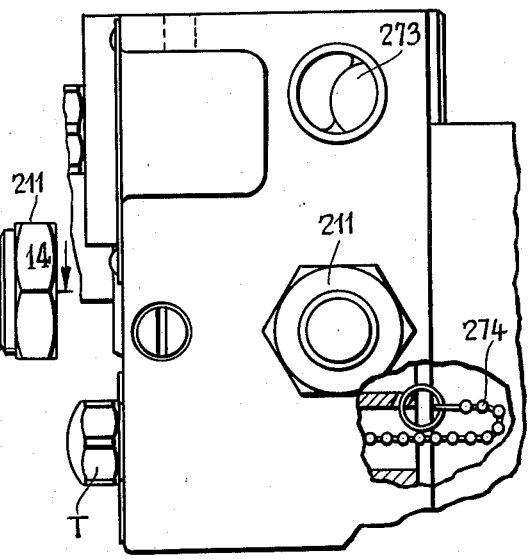
INVENTOR
Thomas R. Thomas
BY
Dean Fairbank & Hirsch
ATTORNEYS

United States Patent Office 2,954,846
Patented Oct. 4, 1960

2,954,846

LUBRICANT MIST GENERATOR

Thomas R. Thomas, New York, N.Y., assignor to Auto Research Corporation, Boonton, N.J., a corporation of Delaware Filed May 8, 1957, Ser. No. 657,807

2 Claims. (Cl. 184—55)

The present invention relates to a lubricating system and it particularly relates to a centralized lubrication system in which the lubricant is suspended in the form of a mist or fog in a gaseous fluid and then is conducted through a series of conduits or pipes where the mist or fog is separated out as oil droplets and is deposited in bearing surfaces.

It is among the objects of the present invention to provide a novel centralized fog or mist lubrication installation of the character above described in which the predetermined quantities of the lubricant will be deposited at various points or at various bearings without regard to their height or remoteness from the central lubricant source and with assurance that all bearings will be adequately lubricated without excess, even though they require relatively minute quantities of lubricant over a predetermined running period.

Another object of the present invention is to provide a novel centralized lubricating installation for feeding lubricant in accordance with bearing requirements of a machine or mechanism throughout the operating period of such machine, with assurance that adequate supply without excess will be supplied to the various bearings throughout operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention, the mist or fog of lubricant is obtained by compressed air which is fed into the lubricated casing. In the preferred construction the incoming compressed air is baffled and deflected so that moisture will be removed therefrom and means are provided for collecting the moisture from the air and it is then conveniently removed from the system.

The air after it has been dehydrated or rendered moisture-free, is caused to pass through a filter and then into a constant pressure chamber, the pressure of which may be maintained by a diaphragm-valve control arrangement. The compressed air after dehydration is caused to pick up oil or lubricant desirable from or in association with a nozzle arrangement or by an aspirator arrangement which will cause the mist or fog to form.

The fog stream or mist contains lubricant droplets of varying sizes, but only the finer ones will remain airborne without causing undesirable wash in the distributing system. Thus the stream from the jet (or nozzle) is directed toward the collector on which the large particles collect and drain back to reservoir, while the very small sized droplets are carried out into the lubricant distributing system. Desirably, the size of the droplets is of the order of less than .001 inch and they may range from .0005 inch to .001 inch.

The important feature of the present invention resides in the fact that the carrying gaseous fluid—preferably compressed air—is first dehydrated, and then is caused to separate the fine lubricant droplets from the larger ones, return the large ones back to the reservoir and carry the fine ones into the distribution system.

At the terminal of the distribution system the meter units will act on the particles or droplets of microscopic size with the result that a predetermined deposition of suspended particles will take place and the proportioned supply to the bearings will take place.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a diagrammatic system illustrating the application of the mist or fog lubricating arrangement of the present invention to a centralized lubricating installation.

Fig. 2 is a side elevational view partly broken away of the central lubricating source.

Fig. 3 is a top plan view taken upon the line 3—3 of Fig. 2.

Fig. 4 is a transverse fragmentary top sectional view of the head of the lubricator unit of Fig. 2.

Fig. 5 is a side elevational view of the lubricator unit taken from the line 5—5 of Fig. 2.

Fig. 6 is a transverse side sectional view upon the line 6—6 of Fig. 3.

Fig. 7 is a transverse sectional view upon the line 7—7 of Fig. 3.

Fig. 8 is a fragmentary top view partly in section of the top of a mist generator similar to Fig. 4, showing an alternative form of baffle having a collecting channel at the lower part thereof.

Fig. 9 is a transverse sectional view taken upon the line 9—9 of Fig. 8, looking upwardly.

Fig. 10 is a fragmentary transverse sectional view taken up the line 10—10 of Fig. 8.

Fig. 11 is a fragmentary side elevational view partly in section, showing an alternative baffle arrangement from that shown in Figs. 4 and 8.

Fig. 12 is a top plan view of a lubricant mist generating device.

Fig. 13 is a fragmentary transverse sectional view taken upon the line 13—13 of Fig. 12, showing an alternative baffle construction.

Fig. 14 is a fragmentary side elevational view partly in section, similar to Fig. 13, and taken upon the line 14—14 of Fig. 15.

Fig. 15 is a transverse horizontal sectional view taken upon the line 15—15 of Fig. 14.

Fig. 16 is a side elevational view of the structure of Fig. 12, partly in section to show the interior construction.

Referring to Fig. 1, there is shown a main lubricator unit A having the head B with the compressed air filter and dehydrator unit C and the oil reservoir or supply unit D.

The mist which is generated is fed out through the branch distributing line E to the bearings F, G, H and I.

The chambers or units C and D receive the air filter J and the oil filter K.

The head A of the lubricator unit is provided with the pressure gauge L, the drip feeding observation unit M, the adjusting screw N controlling the inlet valve element.

The aspirator nozzle P connects the air chamber C with the lubricant reservoir D.

The lubricant will pass in droplet fashion past the needle valve Q.

The lubricant feed is controlled by needle valve Q and air pressure regulator adjustment N. The solenoid valve unit R opens and closes the supply of air at start and stop of machine respectively.

The collector S controls the size of lubricant droplets permitted to enter as fog or mist into the branch distribution system E.

The reservoir is filled through the filler T.

Referring to the air inlet system, the air is admitted under suitable compression through an inlet connection to the tapped opening 10 in the side of the head A (see Figs. 2 and 4). The air then passes through the bore 11 and the vertical passageway 12 into the interior of the transparent cylindrical casing 13 forming part of the air chamber C.

The air fed in through the inlet 10 may be ordinary compressed shop air or it may be some other compressed gaseous fluid such as helium or nitrogen depending upon the particular usage or operation of the mechanism.

The air flowing down through the opening 12 and into the space 14 in the upper part of the chamber C will strike the circular baffle or hood element 15. This hood element has a tapped opening 16 which is screwed upon a threaded sleeve extension 17.

As the air enters the chamber C and is baffled by the circular baffle 15, excess moisture will form in drops which will settle to the bottom 18 of the chamber C.

Any accumulated moisture may be removed through the passages 19 and 20 in the nipple 21 which is mounted on the base 22 of the unit or chamber C.

The petcock 23 will enable any moisture accumulating at 18 to be removed. The petcock when screwed down will permit drainage through the openings 27 and 28, but it will be held against complete removal by means of the resilient extensions or spread ends 29.

The transparent cylinder 13 is clamped between the base 22 and the head A, each having a shallow recess and gasket, such as 24 and 25 in head A.

The nipple 21 which is threaded upon the depending threaded extension 26 will enable the transparent cylinder 13 to be tightly clamped in liquid and airtight fashion between the head A and the base 22.

The threaded extension 26 constitutes the lower end of the central rod 35 which extends upwardly through the coil spring 36, the cylindrical air filter J and the baffle 15 and which is threaded into the head A at 17. It will be noted that the main structural rod 35 in addition to having the passageways 19 and 20 for removal of water, at its lower end will be bored radially at 37 and axially at 38 to provide outlet flow passages for the compressed air after the moisture has been removed and the compressed air has been filtered.

It will be noted that the filter cylinder J is clamped between the inside face 39 of the baffle 15 and the base 40 by the coil spring 36 which presses the base 40 up against the lower end of the cylindrical filter J.

The compressed air which flows through the passageways 37 and 38 will flow into the drilled opening 41 into the chamber 42.

The chamber or pocket 42 receives the valve seating element or plunger 43 which rides in the cylinder or recess 44 and is pressed upwardly by means of the spring 45. The stem 46 presses down on the cylinder element 43 under the influence of the adjustable loaded coil spring 47.

The compression on the coil spring 47 may be varied by means of the screw 48 which is locked in position by means of the jam nut 49.

The flexible diaphragm 60 is clamped into position between the spring 47 and the top of the stem 46 and it forms an upper chamber 61 and a lower chamber 62. The upper chamber 61 is vented to the atmosphere by the small hole 57 at the top of the head A.

The lower chamber 62 is subject to the inlet air pressure in the pocket or chamber 42 as long as the seating or cylindrical element 43 is kept away from the seat 50 at the top of the chamber 42.

The diaphragm 60 in combination with the spring 47 will assure that a uniform air pressure will be maintained in the chamber 62 since when the pressure is too high the diaphragm 60 will be elevated against the spring 47 permitting the valve 43 to close preventing further flow of air through the pocket or chamber 42.

On the other hand when the pressure drops in the chamber 62, the diaphragm 60 will be pressed down by the spring 47 moving the valve cylinder 43 downwardly away from the valve seat 50 and permitting flow of air from the pocket 42 into the lower chamber 62.

This repetitive opening of the valve seating element 43 with respect to the valve 50 will maintain a constant pressure in the chamber 62. The pressure in the chamber 62 may be observed by the gauge L on the outside of the head A. The adjustment of the spring 47 may be so controlled as to give a desired pressure reading on the gauge L.

The chamber 62 communicates through the passageways 63 and 64 (see Fig. 6) with the solenoid valve unit R. The passageway 64 extends into the solenoid valve chamber 65.

The chamber 65 takes the form of an annular groove which is sealed at both sides by the O rings 66 and 67 so that the air must flow through the radial passageway 68. The radial passageway 68 leads to a valve seat 69 and a seating element 70. The valve is normally closed by the compression spring 71.

The seating element 70 has a stem or upwardly extending ferrous tube 72, the upper end of which is threaded at 73 and has a tapped cap 74. This tube extends through the coil 75.

The coil 75 when energized will lift the seating element 70 off its seat 69 allowing air to flow from the radial passageway 68 into the axial passageway 76 and the radial passageway 77 into the peripheral groove 78 (see Fig. 6).

Escape of air from passageways 77 and groove 78 is prevented by O ring 67 and gasket 79.

The air will then flow through the oblique opening or bore 80 to the annular space 81 around the nozzle structure P.

The nozzle structure P is best shown in Fig. 4 and it consists of a central member 90 and an outside member 91. The air entering the space 81 will pass through the tapered crevice 92 and out of the orifice 93 into the chamber 94.

The chamber 94 is divided into two compartments X and Y (see Fig. 4) by the collector S, for the purpose of collecting the larger lubricant particles and letting the fine particles continue into the distributing system E by the outlet adapter 95. The collector chamber receives the discharge from the nozzle P and the discharge chamber Y communicates with the outlet 95. The chamber 94 is connected to the distribution system E by the outlet adapter 95.

The oil or lubricant used is received in the unit D. The unit D has a reservoir 59 made up of a transparent cylinder 110 clamped in position between the gasket 111 in the recess 112 and the base 113 with the gasket 114 by means of the nut 115. The nut 115 is threaded onto the lower threaded end 116 of the central member 117 which extends through the unit D. The upper end of the member 117 has a threaded connection at 118 into the head A.

The lower portion of the central member 117 has a radial opening 119 and the axial opening 120 which communicates with a drain cock 121 similar to the drain cock 23 for drainage purposes.

In the transparent cylinder D is the oil filter K which is clamped between the base 122 and the top 123 by means of the spring 124, said spring reacting against its upper end against the disc 125 which is mounted upon the central element 117.

The radial bores 126 and the axial bore 127 communicate with the interior of the cylindrical filter K to receive lubricant within the transparent cylinder 110.

The pressure of air in the reservoir unit D will force lubricant through the filter element K and through the passageways 126 and 127 of the central support rod 117.

At the top of the central support rod 117 the lubricant will pass into the needle valve control pocket 140 which is controlled by means of the needle valve Q. The needle valve Q may be adjusted by means of its head 141 so as to control the flow of lubricant past its seat 142 under the air pressure in the head 94.

This controlled oil flow past the needle valve seat 142 will move through the cross drilling 143 (see Fig. 5) to the elbow drip fitting 144 in the chamber 145 in back of the sight glass 146 forming part of the observation unit M. The window 146 is held in liquid and airtight fashion by the ring 147 in the outside of the chamber 145.

The position of the needle valve unit Q will be observed by the number of drops from the elbow fitting 144.

From the chamber 145 the lubricant will flow through the passageway 148 (see Fig. 3) into the vertical drilled bore 149 (see Fig. 4) and then into the horizontal drilled bore 150. The passage 149 is plugged tightly at lower or air chamber end. The lubricant will be drawn from the bore 150 into the central passageways 151 and 152 of the inner end of the nozzle P. The oil formed at tip of end 152 will be picked up by the air stream flowing through passageways 81, 92 and orifice 93.

To describe the method of operation of the device, the air is fed in under pressure through the inlet 10 into the cylindrical transparent container C where it is baffled against the hood element 15 and is expanded so that it will lose its moisture which may be removed from the petcock 23.

The air then passes through the cylindrical filter J and through the passageways 41 into the pocket or chamber 42 under the valve seat 50 and above the seating element 43. The passageway 41 is tightly plugged at its outer end so that air can get into pocket 42 only.

The air under pressure will pass into the lower chamber 62 below the diaphragm 60 when the valve or seating element 43 is removed from the seat 50 by the stem 46 which is normally pressed downwardly by the spring 47. The compression on the spring 47 is adjusted by the adjusting screw 48.

With the valve 43 off its seat 50 the pressure in the chamber or pocket 42 will be the same as the pressure in the chamber 62. However, when the pressure is too high, the diaphragm 60 which on its upper face 61 is exposed to atmospheric pressure through the opening 57 will move upwardly permitting the spring 45 to close the valve 43 against the seat 50. By this action which may be rapidly repeated, the pressure is maintained in the pocket 42 and the chamber 62 at a predetermined point as may be set upon the dial L and by adjustment of the hand screw N.

The air then will pass under pressure from the chamber 62 through the passageway 64 (see Fig. 6) and into the peripheral groove 65.

It will then pass into the vertical passageway 76 of Fig. 6 when the solenoid valve is open and thence into the passageway 80 and into the peripheral opening 81 around the nozzle P.

The air after passing through the oblique passageway 92 will exit at orifice 93 aspirating or drawing lubricant from the central passageway 151 through hole 152. A heavy mixture of fog or mist is discharged into the inlet portion X of chamber 94.

The oil in the meantime is forced by the air pressure, above the liquid body, in the reservoir unit D through the filter K, up through the central passageway 127 of the tube 117, past the needle valve Q and into the passageways 148 and 149 (see Figs. 3 and 4).

From the passageway 149 the lubricant will be fed into the central passageway 151 of the nozzle fitting P.

The oil mist after having been freed of the undesirable heavy particles by the collector S is passed through the adapter fitting into the lubricating line E.

The various fittings F, G, H and I at the bearings will serve as meter units to control the supply to a bearing or other point or part requiring lubrication.

The operation may be automatically started with the starting of the machine by the operation of the solenoid valve R.

The fog or mist unit will operate automatically once the diaphragm 60 is set for proper constant pressure and the needle valve Q is adjusted suitably for desired amount of lubricant.

In the embodiment of Figs. 8 and 9, the various parts shown are of the same construction and operation as in Figs. 1–7, except that the collector S has been modified so that as indicated at 200 it is held in position by the flange 201 and screw 202 and it has a gutter 203 which extends across the chamber but reaches its maximum elevation at 204 (see Fig. 10) and then goes downwardly at each end as indicated at 205 (see also Fig. 10).

The central portion of the gutter 203 has an opening therein through which extends the tubular member 117. The adjustable needle valve 207 has a filister slot 208 accessible in the recess 209.

The recess is closed by means of a stub screw 210 and adjustment is only possible when the stub screw 210 is removed.

The outlet 211 of the mist or fog, as indicated by the arrow 212, is slightly larger than as shown in Fig. 4 and has an internal collar portion 213, as well as a hexagon outside portion 214.

The aspirator nozzle P may be of the same construction as is described in connection with Fig. 4, as are also the filter unit C and the supply unit D.

The gutter 203 will take off any condensation or drippage created by the contact of the stream of finely divided oil against the collector 200.

In the embodiment of Figure 11 the collector 225 will replace the collector S of Fig. 4 and it extends straight across the chamber and is inclined upwardly toward and above the aspirator nozzle P toward the corner 226 of the chamber above the unit D.

The lower part of the collector 225 is held in position by the flange 227 which has an opening at 228 to receive the vertical tube 117. This flange is held in position by means of the split ring 229 which fits in the recess 230.

In the embodiment of Figs. 12–16, the collector consists of an adjustable double plate 250 which has an upper section 251 extending across the top of the chamber 252 and a lower section 253 extending obliquely downwardly.

The upper section has an opening 254 through which passes the tube 117. This opening 254 is formed in a downwardly dished portion 255 which is pressed upwardly by the follower 256 having the coil spring 257 behind it.

The coil spring at its lower end 258 is stopped by the washer 259 and the split ring 260. The plate 250 is mounted on the transverse rod 261 which extends across the chamber 252.

The adjusting screw 262 has a threaded portion 263 which extends downwardly through a tapered opening 264 and has a nipple 265 contacting the plate 266. This adjusting screw can change the position of the plate 250 and its upper section 251 and lower section 253.

The collector adjusting screw is readily accessible from the top of the device, as indicated at 262, in Fig. 12, by removal of the plate 266 and the screws 267.

The rod 261 is mounted at its ends by the center tubular mounting element 268 which has a flange 269 held in position by the screws 270.

The collector plate portion 251 will have a recess at 271 to clear the head 272 of the screw 270. This adjustable double collector plate 250—251—253 may be moved upwardly and downwardly between the solid line position, shown in Fig. 14, and the dot and dash line position, shown in Fig. 14.

The electrical conduit connection is indicated at 273 in Fig. 16 as is also the chain 274 for the filling cap T. The mist outlet is indicated at 211 in Figs. 14, 15 and 16.

Although the collector plates S, 200, 225 and 250—251—253 are shown as solid collector plates they may also be made of perforate metal or even of very fine wire mesh screening. These collectors will contact the steam from the jet P and the large particles of oil will collect thereon and drain back into the reservoir D.

The collector plates S, 200, 225 and 250—251—253 are arranged so as to extend completely across the stream passage so that the stream is diverted downwardly and passes under the collector without dividing the stream.

If desired, these collector plates may be cast solid in the head above the chamber D or they can be vertical plates with a gutter, as shown in Figs. 8 or 9, or they can be sloped plates, as shown in Fig. 11, or they may be adjustable between various sloping and vertical positions, as indicated in Figs. 14 to 16, with the adjustment being made in the latter instance by readily removing the chamber plate 266 and the screws 267 which will give access to the adjustment screw 262.

The mist flowing out through the outlet 95 of Fig. 4 or 211 of Figs. 8, 16 will pass through tubing or piping until it meets the meter units which are associated with the bearings to be lubricated. For plain bearings, a simple meter unit may be employed which will change the mist to droplets of a size which will readily deposit on a plain bearing so that very little of the oil content remains in oil mist form and so that there is very little loss of oil or contamination of the surrounding air as the air escapes from a bearing.

It is necessary for the mist generated and supplied through the outlet 95 of Fig. 4 and 211 of Figs. 8–16 to be quite fine so as to permit satisfactory distribution through a branched piping or conduit system without deposition in such conduit, piping or tubing system of any substantial amount of wash. If any wash would form, such wash invariably would feed to the closest bearings and would cause undesirable over-lubrication and drippage of oil thereat.

Another form of outlet fitting which may be utilized is one which will permit the mist to spray directly upon gears and other similar types of contact bearing structures where it is not possible to get a tubing structure direct to the point of lubrication.

These spray jet outlet fittings may have pointed extensions or directors to direct the spray toward the lubricating point.

Mist-jet outlet fittings may also be employed to lubricate high speed ball or roller bearings in which at the outlet of the piping system there will be provided a plain hole in a fitting with a pointed nose so that the mist may be directly applied to the bearings to give the preferred form of lubrication.

In mist lubricating systems of the character described in the present application the preferred tubing may have an O.D. dimension of ⅜" for the main line and an O.D. dimension of ¼" for the branch lines.

All of these outlet meter units should have filters and valves and a typical fitting may have a felt filter and screen, a pin and a disc valve as shown, for example, in Pat. 1,948,503.

At low flow rates the disc valve may be replaced by a ball valve. In some instances, a filter may be omitted, leaving only the screen cup and in other instances the pin may be omitted leaving an open hole, but otherwise the fitting as shown in Pat. 1,948,503 will be satisfactory.

The embodiment of my invention shown and described herein is to be considered merely as illustrative, as my invention is susceptible to variation, modification and change within the spirit and scope of the appended claims.

Having now particularly described and ascertained the nature of the invention, and in what manner the same is to be performed, what is claimed is:

1. A lubricant mist generator having a head and a depending lubricant reservoir mounted on the head, a lubricant conduit extending downwardly from the head into said reservoir to receive lubricant therefrom, a circular mist chamber in said head communicating with said reservoir, said head having a mist creating nozzle at one side of said chamber, said nozzle being directed in a radial direction into said chamber, a mist outlet from said chamber radially aligned with said nozzle at the opposite side of the chamber, an intermediate baffle extending transversely across said chamber between said nozzle and said outlet, and a source of compressed air for said nozzle, said baffle being supported on the upper end of said conduit and having a vertically bulged portion extending toward said nozzle with the sides of the baffle extending rearwardly toward the mist outlet.

2. A lubricant mist generator in accordance with claim 1, wherein means, including a spring, are provided to adjust the position of the baffle relative to the nozzle.

References Cited in the file of this patent

UNITED STATES PATENTS

| | | |
|---|---|---|
| 1,990,524 | Bystricky | Feb. 12, 1935 |
| 2,329,040 | Folke | Sept. 7, 1943 |
| 2,417,403 | Zonis | Mar. 11, 1947 |
| 2,707,529 | Monnier | May 3, 1955 |
| 2,719,604 | Allen | Oct. 4, 1955 |
| 2,730,269 | Earle | Jan. 10, 1956 |
| 2,762,457 | Andresen | Sept. 11, 1956 |
| 2,776,025 | Schweisthal | Jan. 1, 1957 |
| 2,865,469 | Lyden | Dec. 23, 1958 |
| 2,887,181 | Dillon | May 19, 1959 |